(12) United States Patent
Richey (10) Patent No.: US 9,255,235 B2
(45) Date of Patent: Feb. 9, 2016

(54) ORGANIC FUEL PRODUCTS AND FIRE STARTERS

(71) Applicant: Michael F. Richey, Ellington, CT (US)

(72) Inventor: Michael F. Richey, Ellington, CT (US)

(73) Assignee: MCR HOLDINGS GROUP, LLC, Towson, MD (US)

( * ) Notice: Subject to any disclaimer, the term of this patent is extended or adjusted under 35 U.S.C. 154(b) by 0 days.

(21) Appl. No.: 13/894,727

(22) Filed: May 15, 2013

(65) Prior Publication Data

US 2014/0026472 A1 Jan. 30, 2014

Related U.S. Application Data

(63) Continuation-in-part of application No. 13/556,592, filed on Jul. 24, 2012, now Pat. No. 8,444,722.

(30) Foreign Application Priority Data

Jan. 15, 2013 (WO) .............................. 2013-021563

(51) Int. Cl.
| | |
|---|---|
| *C10L 5/00* | (2006.01) |
| *C10L 5/40* | (2006.01) |
| *C10L 5/44* | (2006.01) |
| *C10L 5/42* | (2006.01) |
| *C10L 5/36* | (2006.01) |

(52) U.S. Cl.
CPC . *C10L 5/42* (2013.01); *C10L 5/361* (2013.01); *C10L 5/363* (2013.01); *C10L 5/445* (2013.01); *Y02E 50/10* (2013.01); *Y02E 50/30* (2013.01)

(58) Field of Classification Search
CPC ........... C10L 5/361; C10L 5/363; C10L 5/42; C10L 5/445; Y02E 50/10; Y02E 50/30
USPC ........... 44/550, 552, 589, 593, 594, 595, 605, 44/606
See application file for complete search history.

(56) References Cited

U.S. PATENT DOCUMENTS

| | | | |
|---|---|---|---|
| 3,910,775 | A | 10/1975 | Jackman |
| 4,063,903 | A | 12/1977 | Benningson et al. |

(Continued)

FOREIGN PATENT DOCUMENTS

WO 2011020190 A1 2/2011

OTHER PUBLICATIONS

International Search Report and Written Opinion issued in corresponding PCT Application No. PCT/US2014/038156 mailed on Sep. 4, 2014.

*Primary Examiner* — Pamela H Weiss
(74) *Attorney, Agent, or Firm* — MKG LLC (57) ABSTRACT

Ecologically friendly and organically composed fuel products and fire starters are presented. The composition of products and starters includes, but is not limited to: 58 to 60 percent decomposed straw, 38 percent horse or cow manure, and optionally, two percent hay mixture from various blends used as feed, and two percent straw dust from material pounded on by animals. During a formation process the composition is subjected to a number of steps with the end product being a hydraulically compressed fuel log, brick, ball, block, briquette, blank, pellet, and the like, dried to a less than 10 percent moisture content. While the process is applicable to formation of organic fuel products and fire starters, other ingredients may be used to produce other types of fuel products, both organic and inorganic, including wood chips, other kinds of animal manure.

17 Claims, 7 Drawing Sheets

(56) References Cited

U.S. PATENT DOCUMENTS

| | | |
|---|---|---|
| 4,152,119 A | 5/1979 | Schulz |
| 4,372,749 A | 2/1983 | Nielsen |
| 4,496,365 A | 1/1985 | Lindemann |
| 6,113,662 A | 9/2000 | Sprules |
| 6,149,694 A * | 11/2000 | Redden et al. .................. 44/552 |
| 6,506,223 B2 | 1/2003 | White |
| 6,544,425 B2 | 4/2003 | Miller |
| 7,252,691 B2 | 8/2007 | Philipson |
| 8,444,722 B2 * | 5/2013 | Richey ........................... 44/605 |
| 2007/0006526 A1 | 1/2007 | Cullen |
| 2011/0162264 A1 | 7/2011 | Richey et al. |

\* cited by examiner

| Material Ingredients / Components | |
|---|---|
| Natural Field Straw | 58-60% |
| Manure Horse / Cow | 38% |
| Hay Mixture Feed | 2% |
| Straw Dust | 2% |
| Wax | 2% |
| Additive to Provide Visual and/or Aromatic Feature 1% | |

Wax and Additive rows: Optional

ORGANIC FUEL PRODUCTS AND FIRE STARTERS

CROSS-REFERENCE TO RELATED APPLICATIONS

This application is a continuation-in-part of and claims priority to U.S. patent application Ser. No. 13/556,592, filed Jul. 24, 2012, now U.S. Pat. No. 8,444,722, issued on May 21, 2013, which is a continuation application and claims priority to U.S. patent application Ser. No. 12/655,716, filed on Jan. 6, 2010, now abandoned. This application also relates to International Patent Application Serial No. PCT/US2013/21563, filed Jan. 15, 2013. The disclosures of these patent documents are incorporated herein by reference in their entireties.

COPYRIGHT NOTICE

A portion of the disclosure of this patent document contains material, which is subject to copyright protection. The copyright owner has no objection to the facsimile reproduction by anyone of the patent document or the patent disclosure, as it appears in the United States Patent and Trademark Office files or records, but otherwise reserves all copyright rights whatsoever.

BACKGROUND OF THE INVENTION

1. Field of the Invention

The present invention relates to ecologically friendly fuel products and fire starters and, more particularly, to ecologically friendly fuel products such as, for example, fuel logs, blocks, bricks, pellets and the like, and fire starters made from organic and inorganic material.

2. Description of the Related Art

The search for new energy sources is on ongoing concern for all humanity as a rate of depletion of oil reserves and other energy sources such as, for example, coal, natural gas, wind, solar, nuclear, hydrogen, increases with rising demand. Additionally, concerns grow over the treatment of waste products with respect to, for example, safety, reliability, and disposal of the waste product. Accordingly, the inventor has determined that the exploitation of new energy sources can go hand-in-hand with addressing the problem of how to dispose of and potentially reuse, recycle, or usefully convert, all of the waste material and products, both organic and inorganic, produced by humans and/or animals in commercial, agricultural and/or industrial activities. As the protection and preservation of the environment is of paramount concern, the reuse and recycling of all manner of waste product, human and non-human, organic and inorganic, is being undertaken at all levels of society, whether it is personal, occupational, or governmental level.

One of the most common and overlooked sources of waste and potential energy is livestock manure which can include, but is not limited to, manure produced by cattle, horses, sheep, goats, pigs, poultry, and the like. Such waste materials accumulate in amounts over millions of pounds per year. These waste materials must be disposed of in environmentally safe and governmentally approved methods. With economic circumstances squeezing agricultural and other establishments using animals and live stock, such as small farms and/or sporting facilities, along with the increased costs and complexities of appropriately disposing of all the waste materials and products, establishments are investigating ways to convert the waste material into a usable product. It is generally known that if a usable fuel can be generated from such waste material, the fuel would be both eco friendly and profitable for the establishment. The prior art discloses a variety of methods and processes for converting various types of organic and inorganic material into usable fuel product.

For example, Jackman (U.S. Pat. No. 3,910,775) is seen to describe a method and an apparatus for handling refuse, using waste and treating raw sewage wherein the material is processed into a source of energy.

Beningson et al. (U.S. Pat. No. 4,063,903) is seen to describe an apparatus for disposal of solid wastes and recovery of fuel product therefrom through the conversion of the organic fraction of such wastes to fuel by the recovery of the constituents of the inorganic fashion.

Schulz (U.S. Pat. No. 4,152,119) is seen to describe briquettes of a specified geometry and composition that are produced to serve as feed material or "burden" in a moving-burden gasifier for the production of a synthesis or fuel gas from organic solid waste materials and coal.

Nielsen (U.S. Pat. No. 4,372,749) is seen to describe a method for the manufacturing of fuel briquettes from selected components of garbage that are comminuted and combined with coal dust.

Lindemann (U.S. Pat. No. 4,496,365) is seen to describe a method of producing briquettes from organic waste products by the use of high pressure to produce sterilized fuel briquettes of high heating values.

White (U.S. Pat. No. 6,506,223) is seen to describe a fuel pellet that is produced by the combination of organic waste material with a binder obtained by direct liquefaction and/or fast pyrolysis of biomass material.

Miller (U.S. Pat. No. 6,544,425) is seen to describe a method of dewatering coal tailings and slurries and removing contaminants therefrom.

Cullen (U.S. Patent Application Pub. No. US 2007/0006526 A1) is seen to describe fuel pellet briquettes manufactured from biomass and recovered coal slurries.

Philipson (U.S. Pat. No. 7,252,691) is seen to describe a process for the conversion of municipal solid waste to combustible pellets of high fuel value.

Nonetheless, despite the ingenuity of the above apparatuses, methods, and processes, there remains a need for ecologically friendly fuel products and fire starters and, more particularly, for ecologically friendly fuel products such as, for example, fuel logs, blocks, bricks, pellets and the like, and fire starters made from organic and inorganic material including for example, waste matter, readily available on agricultural and livestock establishments such as, for example, farms and/or sporting establishments.

SUMMARY OF THE INVENTION

The present invention is directed to ecologically friendly organic fuel products and fire starters including products in the form of logs, balls, blocks, bricks, briquettes, blanks, and/or pellets from organic material that include straw and manure from, for example, cattle; sheep, goats, poultry, horses and the like. The fuel products and fire starters, in any of the above forms, is a mixture composed by weight or volume of the following elements, components, and/or ingredients in various combinations: at least about fifty-eight to sixty percent (58% to 60%) decomposed straw, at least about thirty-eight percent (38%) horse and/or cow manure, about two percent (2%) hay mixture of various blends that is dry and used as feed, and about two percent (2%) straw dust that is from material that has been pounded on by animals. The mixture can vary up or down (e.g., plus or minus) by up to about six percent (6%) of each element, component and/or ingredient.

In one embodiment, the fuel products and fire starters are hydraulically compressed to a solid configuration weighing approximately two pounds (2 lbs.; 0.91 kilograms), plus or minus several ounces, and whose dimensions are at least about two and one half inches (2.5 in.; 6.35 centimeters (cm.)) wide, three and one half inches (3.5 in.; 8.89 cm.) high, and six inches (6 in.; 15.24 cm.) in length. It should be appreciated that the above described compression process could also be used in the creation of fuel and/or fire staring logs, balls, bricks, briquettes, blanks, or pellets incorporating, for example, wood chips and coal slurry material. Thus, both organic material and/or inorganic material, though not necessarily mixed together, can be subjected to the above process and method for producing fuel products and fire starters.

In one aspect, the present invention provides a process and a method for manufacturing organic fuel products and fire starters in various forms, each that are renewable and reduce the carbon footprint on the earth.

In another aspect, the present invention provides a process and a method for manufacturing organic fuel products and fire starters in various forms, each that is eco friendly and is made from readily available natural resources.

In yet another aspect, the present invention provides a process and a method for manufacturing organic fuel products and fire starters in various forms, each that burn clean and puts carbon in the ash to be deposited back into the ground.

In still another aspect, the present invention provides a process and a method of manufacturing organic fuel products and fire starters in various forms, each that avoid the formation of creosote in a chimney or other exhaust line or outlet, and that reduce any risk of fire.

In still yet further aspect, the present invention provides a process and a method of manufacturing organic fuel products and fire starters in various forms, each that eliminate all work from splitting wood, chain saw, use of gasoline, and the problems that arise from wood stacked in the home such as, for example, the attraction and potential infestation of bugs, and of the labor associated with the above.

In still further aspects, the present invention provides a process and a method of manufacturing organic fuel products and fire starters that are manufactured in pellet form suitable for use, for example, in a pellet stoves and the like.

In still further aspects, the present invention provides a process and a method of manufacturing organic fuel products and fire starters that are used for fertilizer in pots, directly in gardens, and with one of the components helping to, for example, keep moisture around plants and other vegetation thereby reducing the need to water the plants and vegetation.

In still further aspects, the present invention provides a process and a method of manufacturing organic fuel products and fire starters that are wholly organic and eliminate, or at least reduce, any need for the use of chemicals of any kind.

In still further aspects, the present invention provides a process and a method of manufacturing organic fuel products and fire starters that when manufactured and configured in pellet form can be used in a variety of flora that require nutrients.

In still further aspects, the present invention provides a process for creating an organic fuel product from raw organic material, the process comprising: placing straw in a first grinder for grinding; cleaning the ground straw by removing seeds; hammering the straw in a hammering process; heating the straw to a temperature of at least 110 degrees Fahrenheit; providing the straw to a second grinder for mixing and grinding; adding manure to the second grinder for mixing and grinding with the straw; providing the mixed and ground straw and manure to a tumble dryer for drying the straw and manure mixture to an amount that is less than ten percent of the original moisture content of the straw; and providing the intermixed straw and manure from the tumble dryer to a hydraulic press for compacting and compressing the intermixed straw and manure thereby creating an organic fuel product.

In one embodiment, the process for creating the organic fuel product, further including providing at least one of hay and straw dust that is added to and intermixed with the straw at the first grinder. In one embodiment, the hay is at least one of hay that is used to feed animals, hay that is used as bedding for animals and hay that is used as mulch. In one embodiment, the hydraulic press of the process for creating the organic fuel product exerts a pressure of at least 22,000 pounds per square inch.

In one embodiment, the fuel product produced by the process is comprised of straw in a range of about 58 to 60 percent by weight. In one embodiment, the fuel product produced by the process is comprised of manure in a range of about 38 percent by weight. In one embodiment, the manure is derived from horses. In one embodiment, the manure is derived from cows. In yet another embodiment, the manure is derived from swine. In still another embodiment, the manure is derived from poultry.

In one embodiment, the fuel product produced by the process is comprised of hay in a range of about 2 percent by weight. In one embodiment, the fuel product produced by the process is comprised of straw dust in a range of about 2 percent by weight.

In one embodiment, the fuel product produced by the process is configured in the form of a cylindrical pellet. In another embodiment, the fuel product produced by the process is configured in a form of a brick that is at least six inches long, at least two and one half inches wide and at least three and one half inches high.

In one embodiment, the process for creating the organic fuel product, further includes, prior to the step of adding the manure to the second grinder, composting the manure for a period of time of at least about one day to forty-five days.

In one embodiment, the process for creating the organic fuel product further includes filtering an output of the first grinder to collect contaminates including at least one of fine or coarse dust, powders or particles, gases and/or a combination thereof.

BRIEF DESCRIPTION OF THE DRAWINGS

The features and advantages of the present invention will be better understood when the Detailed Description of the Preferred Embodiments given below is considered in conjunction with the figures provided.

In these figures like structures are assigned like reference numerals, but may not be referenced in the description of all figures.

DETAILED DESCRIPTION OF THE PREFERRED EMBODIMENTS

Figure 1:
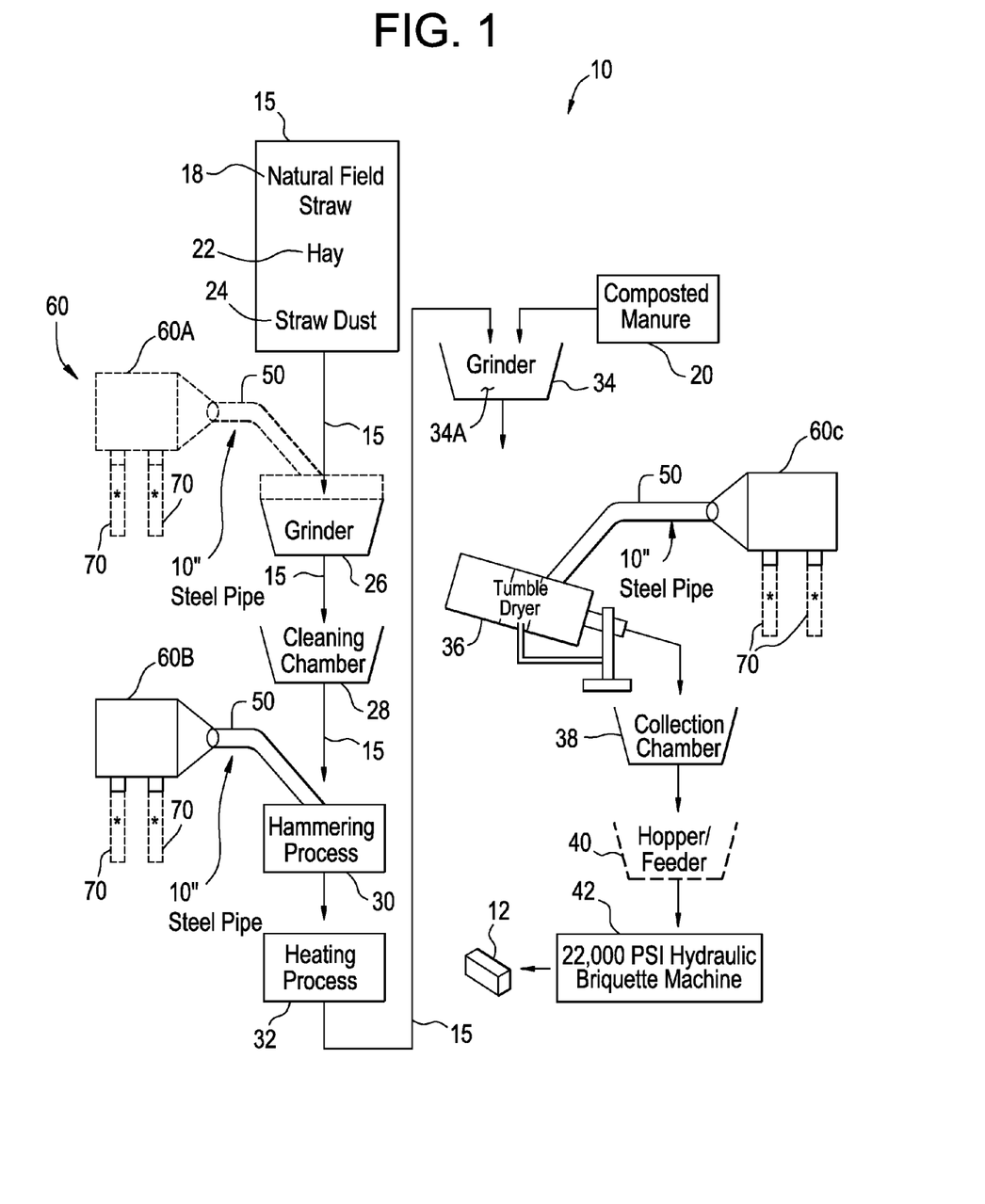
FIG. 1 is an exemplary schematic diagram of one process and method of manufacturing organic fuel products and fire starters illustrating the method and processing steps of converting natural materials to a usable fuel product and fire starter.
Figure 5:
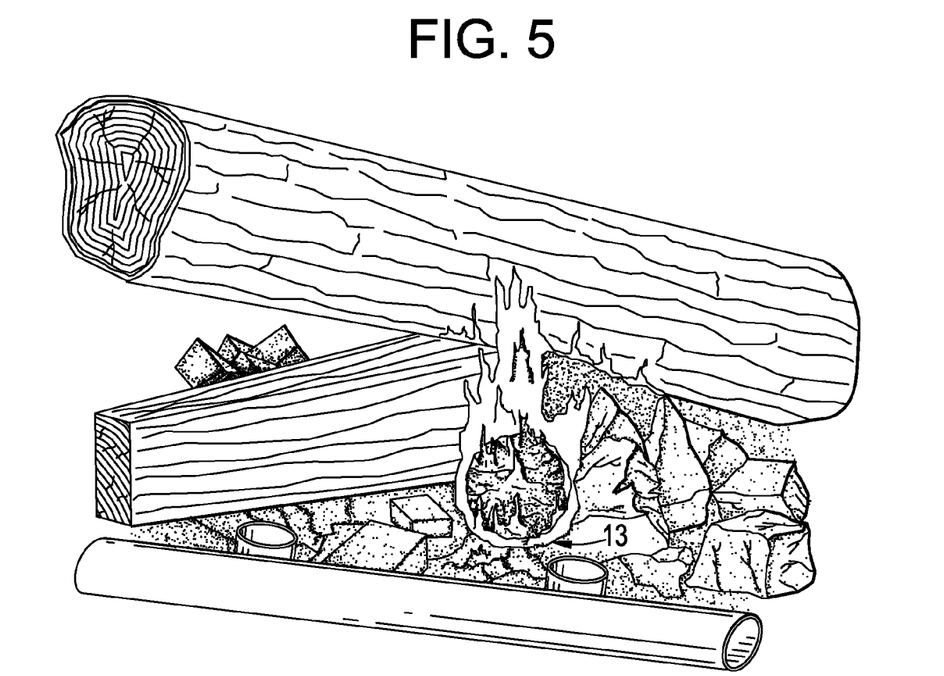
FIG. 5 is an elevation view of a fire starter, formed by the process and method illustrated in FIG. 1, in use.
Figure 6:
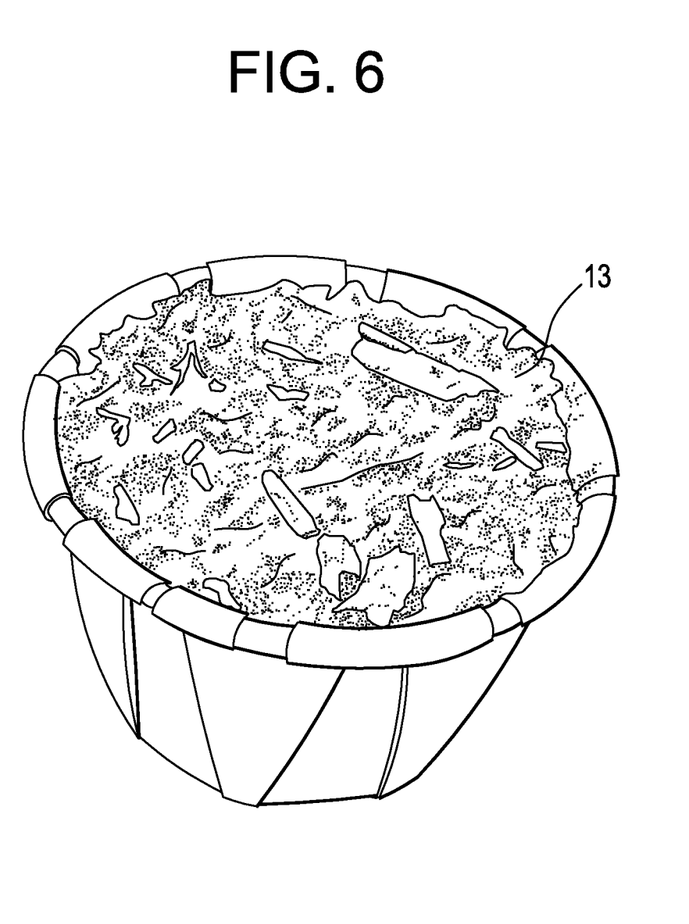
FIG. 6 is a perspective view of the fire starter of FIG. 5.

As illustrated in FIGS. 1 to 8, ecologically friendly, organically composed fuel products and fire starters including products in the form of logs, balls, spheres, blocks, bricks, briquettes, blanks, and/or pellets are formed in a method and/or process 10 generally depicted in FIG. 1. In one embodiment, a fuel product is formed as a fuel brick 12 (FIGS. 1 and 2), in another embodiment, the fuel product is formed as a cylindrical pellet 14 (FIG. 3), and in still another embodiment, a fire starter is formed as a fire starting ball or fire starter 13 (FIGS. 5 and 6).

As illustrated in FIGS. 1-4, raw organic materials 15 such as, for example, components, elements and/or ingredients set forth in the Table 16 (FIG. 4) are provided to form the ecologically friendly, organically composed fuel products and fire starters, such as the fuel brick 12 or fuel pellet 14, including: by weight about fifty-eight to sixty percent (58% to 60%) straw 18 that has been hammered, cleaned of all seeds, and heated to a temperature from about sixty-five degrees Fahrenheit (65° F.; about 18.3° C.), to about two hundred degrees Fahrenheit (200° F.; about 93.3° C.), and preferably to at least about one hundred ten degrees Fahrenheit (110° F.; about 43.3° C.), then decomposed for a time period from about one (1) day to about forty-five (45) days or more, and preferably to at least about forty-five (45) days; about thirty-eight percent (38%) animal manure 20 preferably, but not exclusively limited to, horse or cow manure that is removed from stalls and kept dry under cover and mixed with straw compound; about two percent (2%) hay mixture of various blends that is dry and used as feed; and about two percent (2%) straw dust that is derived from material that has been pounded on by, for example, animals such as the aforementioned horses, cows, and the like.

It should be appreciated that it is within the scope of the present invention that the components, elements and/or ingredients that comprise the mixture that form the fuel products (e.g., fuel brick 12 or fuel pellet 14) can vary up or down (e.g., plus or minus) by approximately six percent (6%) of each component, element and/or ingredient. For example, the mixture that forms the fuel products may or may not include hay 22 and/or straw dust 24. Moreover, wax 25 is optionally added to the mixture by decreasing one or more of the aforementioned components, elements and/or ingredients, when the mixture is used to form the fire starter 13. As such, wax 25 is not a required element for fuel products (e.g., the fuel brick 12 or the fuel pellet 14). Similarly, one or more additives 21 may optionally be added to the mixture by decreasing one or more of the aforementioned components, elements and/or ingredients, when the mixture is used to form the fuel products (e.g., fuel brick 12 or fuel pellet 14) and/or the fire starter 13 to provide a visual and/or aromatic feature, as described below. The one or more additives 21 may be added by weight at about less than one percent or one percent to five percent (<1% or 1% to 5%). It should also be appreciated that while the manure is described as being preferably from horses or cows, the manure may also be manure produced by, for example, cattle, sheep, goats, pigs, poultry, and the like. Similarly, while the hay is described as being feed grade hay, it is also within the scope of the present invention to use other blends of hay such as, for example, bedding hay, mulch hay and the like.

When the forming process 10 of FIG. 1 is completed, the fuel products and/or fire starter (and components, elements and/or ingredients thereof) are dried to less than about ten percent (10%) of their moisture content.

Figure 2:
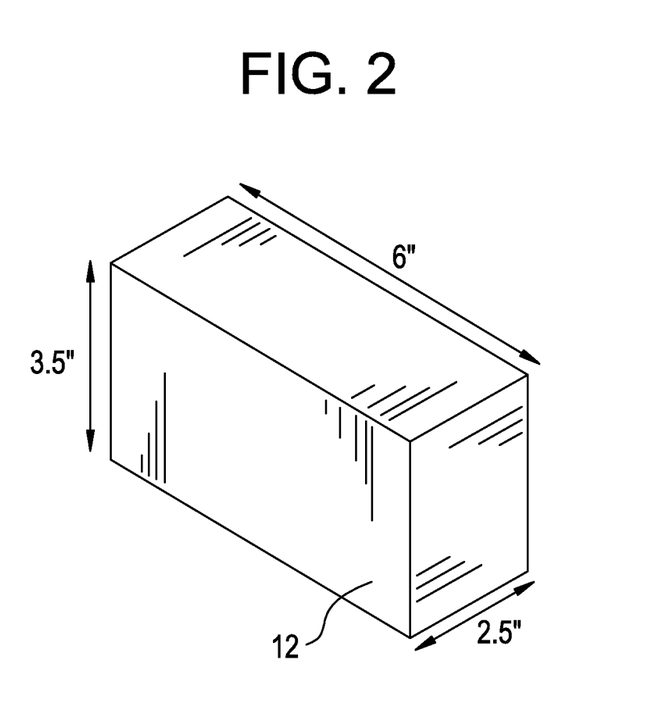
FIG. 2 is a perspective view of a fuel product, e.g., a fuel briquette, formed by the process and method illustrated in FIG. 1.
Figure 3:
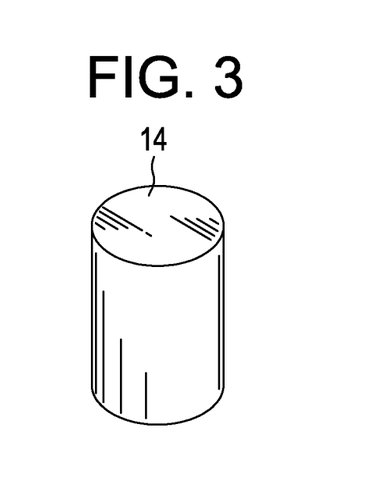
FIG. 3 is a perspective view another fuel product, e.g., a cylindrical pellet, formed by the process and method illustrated in FIG. 1.
Figure 4:
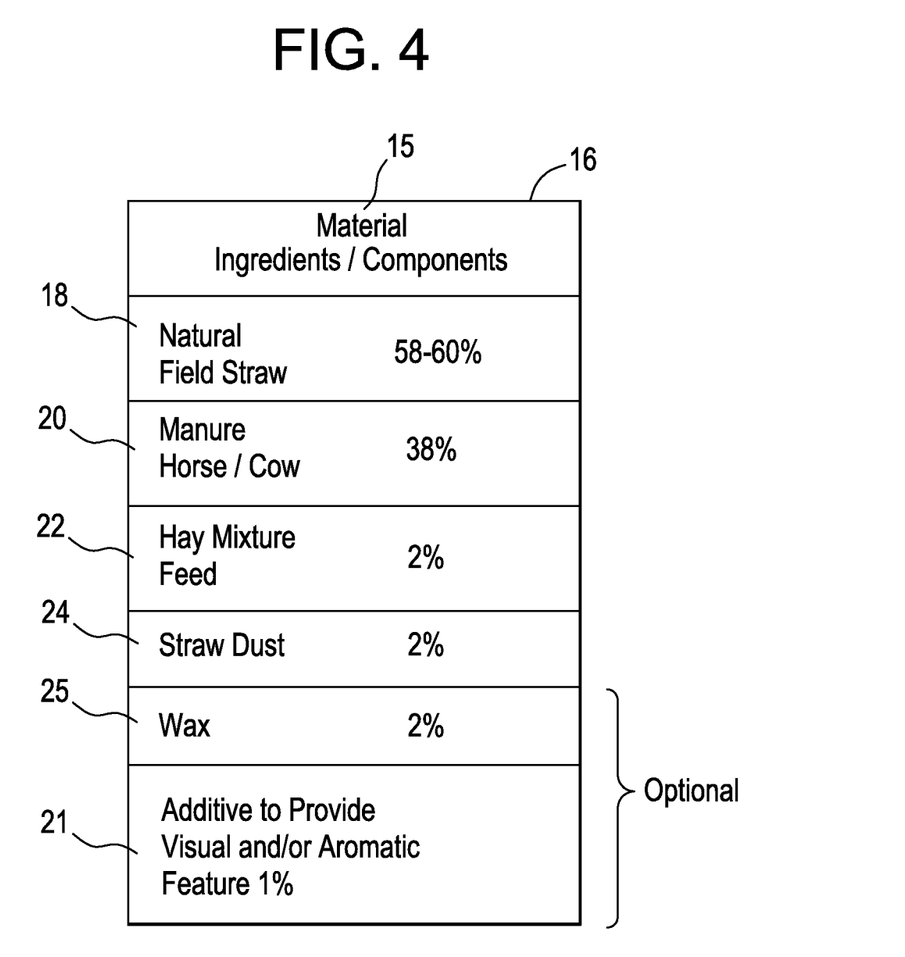
FIG. 4 is a table of exemplary ingredients used in the process and method of FIG. 1.

In general, the components, elements and/or ingredients 15 are run through a medium to a fine grinder in a tube system that then feeds the components, elements and/or ingredients 15 to a hopper that then feeds the material through to a piping system that is computer controlled. This allows enough raw materials of the components, elements and/or ingredients 15 to enter a chamber that forms the fuel products and/or fire starter. In one embodiment, this step is electronically controlled by a visual inspection system. The material is then hydraulically compacted by at least about twenty-two thousand (22,000) or more pounds of pressure thereby creating a form, such as for example, the block or brick 12 that weigh approximately two pounds (2 lbs.; 0.91 kg.) plus or minus several ounces. As shown in FIG. 2, in one embodiment, the configuration of the ecologically friendly, organic fuel brick 12 includes dimensions of at least about six inches (6 in.; 15.24 cm.) long, two and one half inches (2.5 in.; 6.35 cm.) wide, and three and one half inches (3.5 in.; 8.89 cm.) high.

More specifically, with reference to FIG. 1, the process or method 10 for creating or producing the organic fuel products (e.g., the fuel brick 12 or fuel pellet 14) from the above described raw organic materials 15 (e.g., the components, elements and/or ingredients 15 of FIG. 4), includes the following steps. First, the raw materials 15, e.g., natural field straw 18 with or without one or more of hay 22 and/or straw dust 24 is provided, and then the raw material 15 is deposited in (e.g., by feed from a conduit) a first grinder 26 to undergo a grinding process. In one embodiment, depicted in FIG. 1, a first one 60A of a filtration system 60 is optionally coupled to the first grinder 26 by a conduit 50 such as, for example, a flexible, semi-rigid or rigid pipe (e.g., a ten inch (10") steel pipe). The filtration system 60, described in detailed below, receives and collects or filters contaminates such as, for example, fine or coarse dust, powders or particles, gases (e.g., ammonia gas) and/or a combination thereof. Next, the ground material 15 comprising the natural field straw 18, with or without one or more of hay 22 and straw dust 24, passes to a cleaning chamber 28 for cleaning and to undergo a removal of scales and a cleaning of all seeds, and the like. Next the cleaned and ground material 15 passes to the hammering process 30. As shown in FIG. 1, a second one 60B of the filtration system 60 is coupled to the hammering process by a conduit 50 to receive and collect or filter contaminates output therefrom. From the hammering process 30 the raw material 15 moves to a heating process 32 where the hammered, cleaned and ground material 15 is heated to a temperature of at least about one hundred and ten degrees Fahrenheit (110° F.; about 43.3° C.). The heated material 15 then passes to a second grinder 34 having a mixing and grinding chamber 34A. At the second grinder 34 animal manure 20 such as, for example, horse or cow manure that has been decomposed or composted for a time period of at least about forty-five (45) days, is added to the processed material 15 (e.g., in one embodiment, the processed straw 18 with or without one or more of hay 22 and straw dust 24). It should be noted that the percentage amounts of each component, element and/or ingredient of the mix comprising the material 15 (e.g., the straw 18, manure 20 either horse or cow, hay 22 and straw dust 24) can vary up or down (plus or minus) by at least about six percent (6%). As shown in FIG. 1, the filtration system 60 is optionally omitted from the second grinder 34, although it should be appreciated that it is within the scope of the present invention to optionally provide one of the filtration system 60 coupled to the second grinder 34.

The processed material 15, which now includes the manure 20, is provided to, for example, a tumble dryer 36 that dries the processed material 15 to below less than about ten percent (10%) of its original moisture content. As shown, a third one 60C of the filtration system 60 is coupled to the tumble dryer 36 by a conduit 50 to receive and collect or filter contaminates output therefrom.

From there the processed material 15 is provided to a collection chamber 38 and then, optionally, the material 15 is provided to a hopper feeder 40 (shown in dashed lines). In one embodiment, the hopper feeder 40 selectively feeds the processed material 15 to a hydraulic press 42 such as, for example, a briquette machine, that compresses or compacts the processed material 15 by the application of about twenty-two thousand (22,000) or more pounds of pressure thereby creating the organic fuel product (e.g., the fuel block 12) having predetermined dimensions. It should be appreciated that it is within the scope of the present invention to eliminate the hopper feeder 40 as other means may be employed to selectively feed the processed material 15 to the hydraulic press 42. It should also be appreciated that it is within the scope of the present invention to form/configure various shaped fuel products such as logs, balls, blocks, bricks, briquettes, blanks, and/or pellets in the hydraulic press 42 including the fuel brick 12 (FIGS. 1 and 2), the cylindrical pellet 14 (FIG. 3), and the fire starting ball 13 (FIGS. 5 and 6).

In one aspect of the present invention, to form the fire starter 13 as illustrated in FIG. 5, prior to processing by the hydraulic press 42, wax 25 is added to the processed material 15 (e.g., the processed straw 18, manure 20 either horse or cow, with or without one or more of hay 22 and straw dust 24). In one embodiment, the fire starter 13 includes: by weight about fifty-eight to sixty percent (58% to 60%) straw 18 that has been hammered, cleaned of all seeds, and heated to a temperature from about sixty-five degrees Fahrenheit (65° F.; about 18.3° C.), to about two hundred degrees Fahrenheit (200° F.; about 93.3° C.), and preferably to at least about one hundred ten degrees Fahrenheit (110° F.; about 43.3° C.), then decomposed for a time period from about one (1) day to about forty-five (45) days or more, and preferably to at least about forty-five (45) days; about thirty-eight percent (38%) animal manure 20 preferably, but not exclusively limited to, horse or cow manure that is removed from stalls and kept dry under cover and mixed with straw compound; about two percent (2%) wax 25. The processed material 15 and wax 25 mixture is next sent to the hydraulic press 42 that compresses or compacts the processed material 15 by the application of about twenty-two thousand (22,000) or more pounds of pressure thereby creating the organic fire starter 13 having predetermined dimensions such as, for example, a ball or sphere shape. In one embodiment, the fire starter 13 is not sent to the hydraulic press 42 and, as such, does not undergo the compressing or compacting step. Rather, the mixture of the processed material 15 and the wax 25 is otherwise formed into sphere or ball shape for use.

In yet another aspect of the present invention the components, elements and/or ingredients that comprise the mixture that form the fuel products (e.g., fuel brick 12 or fuel pellet 14) and/or the fire starter 13 includes the additives 21 to enhance a visual or aromatic feature of the fuel products (e.g., fuel brick 12 or fuel pellet 14) and/or the fire starter 13. For example, it should be appreciated that it is within the scope of the present invention to add a fragrance such as, for example, lavender, rose, sandlewood, pine, patchouli and the like, to provide a more aesthetically pleasing smell or aroma to the products as they are stored and/or used. Similarly, it should be appreciated that a component may be added to provide a preferred color to the fuel products and/or fire starters while not in use (e.g., in shipment, storage and/or display) or which when used burns to provide a desirable visual effect (e.g., color or other effect).

Figure 7A:
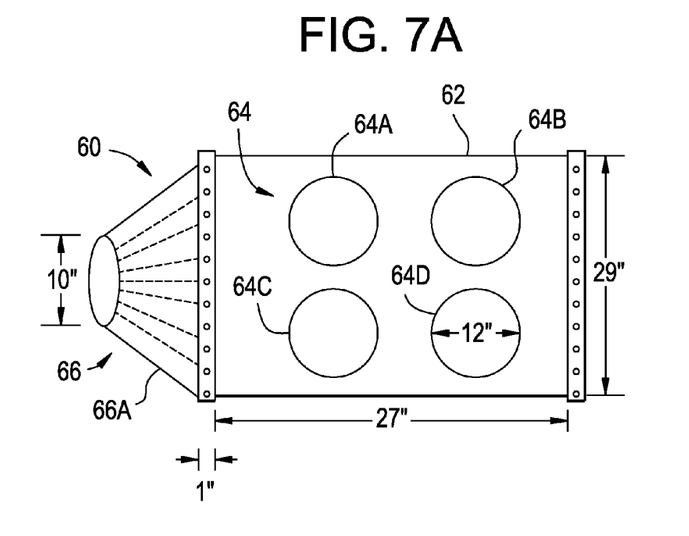
FIGS. 7A and 7B are views of a filtration system in accordance with one embodiment of the present invention.
Figure 7B:
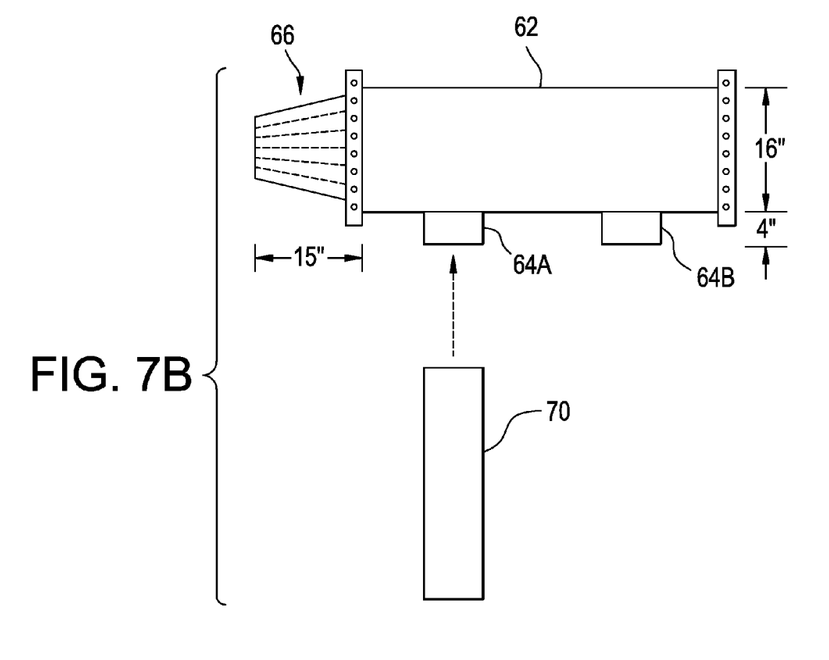
Figure 8:
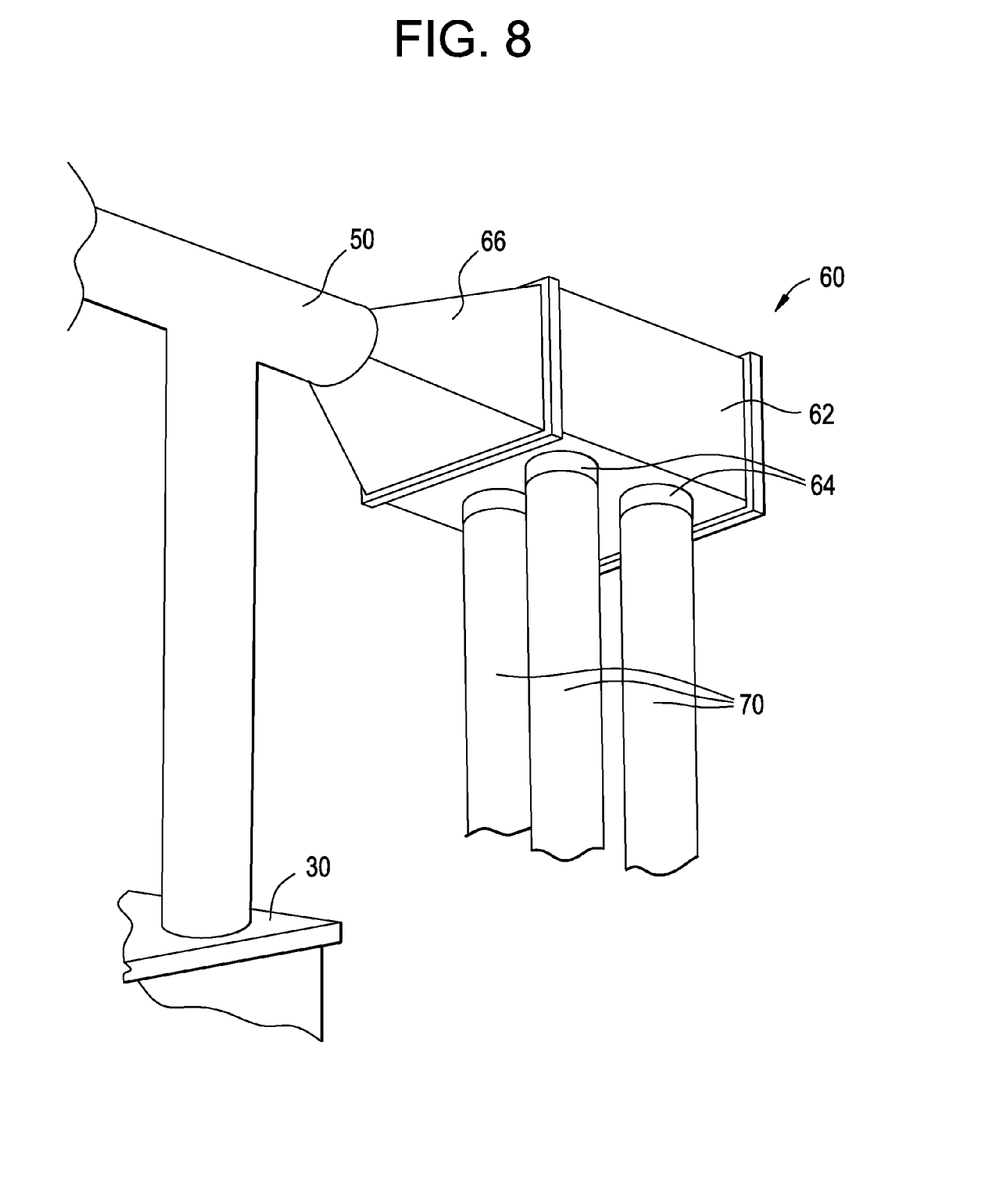
FIG. 8 depicts the filtration system of FIGS. 7A and 7B deployed, in one embodiment of the present invention, to filter output from a hammering process of the process of FIG. 1.

The filtration system 60, in accordance with one embodiment of the present invention is depicted in FIGS. 7A, 7B, and 8. As shown in FIG. 7A, that depicts a bottom view, the filtration system 60 includes a filtration chamber 62 having one or more input ports 66 (e.g., one (1) input port 66A shown) and one or more output ports 64 (e.g., four (4) output ports 64A to 64D shown). As described above, the filtration system 60 receives an air flow, via the conduit 50 coupled to the one or more input ports 66, from one or more steps of the process of FIG. 1, and collects or filters contaminates such as, for example, fine or coarse dust, powders or particles, gases (e.g., ammonia gas) and/or a combination thereof, from the air flow. As shown in FIGS. 7B and 8, one or more filtration bags or containers 70 are coupled to the one or more output ports 64. In one embodiment, the filtration bag or container 70 is selectively attachable and detachable from the one or more output ports 64 to permit periodic removal for cleaning. In one embodiment, the filtration bag or container 70 comprised of fabric or like material having a capability to filter or screen gases, particles and other contaminates. In one embodiment, the filtration bag or container 70 filters, at an about ninety-nine percent (99%) efficiency, particles having a size in a range of about one (1) micron or more.

While various changes in the details, steps, and components that have been described may be made by those skilled in the art within the principles and scope of the invention herein illustrated and defined in the appended claims; therefore, the invention has been shown and described herein in what is believed to be the most practical and preferred embodiments, it is recognized that departures can be made therefrom within the scope of the invention, and that are not to be limited to the details disclosed herein, but is to be accorded the full scope of the claims so as to embrace any and all equivalent processes, methods, steps, and end products.

What is claimed is:

1. An organic fuel product, comprising:
 raw organic material including straw that is ground, cleaned to remove seeds, hammered and heated to a temperature of at least 110 degrees Fahrenheit to form a processed material; and
 manure mixed with the processed material, the mixture of the processed material and manure being ground and dried to an amount that is less than ten percent of the original moisture content of the straw;
 wherein the dried mixture is compacted and compressed into a predetermined shape fuel product by a hydraulic press.

2. The organic fuel product of claim 1, wherein the raw organic material further includes one or more of hay in an amount of about two percent (2%) by weight and straw dust in an amount of about two percent (2%) by weight.

3. The organic fuel product of claim 1, wherein predetermined shape includes one of a log, a ball, a sphere, a block, a brick, a briquette, a blank and a pellet.

4. The organic fuel product of claim 1, further including wax in an amount of about two percent (2%) by weight to form a fire starter.

5. The organic fuel product of claim 1, wherein the straw is included in an amount of between about fifty-eight to sixty percent (58% to 60%) by weight.

6. The organic fuel product of claim 1, wherein the manure is comprised of at least one of horse and cow manure.

7. The organic fuel product of claim 1, wherein the manure is included in an amount of about thirty-eight percent (38%).

8. The organic fuel product of claim 1, further including an additive in an amount of about less than one percent (<1%) or one percent (1%) to about five percent (5%) by weight, the additive providing at least one of a visual and aromatic feature to the fuel product.

9. A process for creating an organic fuel product from raw organic material, the process comprising:
    placing straw in a first grinder for grinding;
    filtering an output of the first grinder to collect contaminates including at least one of fine or coarse dust, powders or particles, gases and/or a combination thereof;
    cleaning the ground straw by removing seeds;
    hammering the straw in a hammering process;
    heating the straw to a temperature of at least 110 degrees Fahrenheit;
    providing the straw to a second grinder for mixing and grinding;
    adding manure to the second grinder for mixing and grinding with the straw;
    providing the mixed and ground straw and manure to a tumble dryer for drying the straw and manure mixture to an amount that is less than ten percent of the original moisture content of the straw; and
    providing the intermixed straw and manure from the tumble dryer to a hydraulic press for compacting and compressing the intermixed straw and manure thereby creating an organic fuel product.

10. The organic fuel product of claim 8, wherein the additive is comprised of a fragrance including one of lavender, rose, sandlewood, pine, and patchouli to provide an aroma to the fuel product during storage, display and use.

11. The organic fuel product of claim 8, wherein the additive is comprised of a dye to provide a color to the fuel product during storage, display and use.

12. The organic fuel product of claim 8, wherein the additive is comprised of a dye to provide a visual effect to the fuel product while burning.

13. The process for creating the organic fuel product of claim 9, further including:
    filtering an output of the hammering process to collect contaminates including at least one of fine or coarse dust, powders or particles, gases and/or a combination thereof.

14. The process for creating the organic fuel product of claim 9, further including:
    filtering an output of the second grinder to collect contaminates including at least one of fine or coarse dust, powders or particles, gases and/or a combination thereof.

15. The process for creating the organic fuel product of claim 9, further including:
    filtering an output of the tumble dryer to collect contaminates including at least one of fine or coarse dust, powders or particles, gases and/or a combination thereof.

16. The process for creating the organic fuel product of claim 9, wherein the filtering is performed by a filtration system, the filtration system comprising:
    a filtration chamber having one or more input ports and one or more output ports;
    the one or more input ports receiving an air flow via a conduit from the output of the first grinder; and
    the one or more output ports each including a filtration bag selectively attachable thereto, the filtration bag having a capability to filter the at least one fine or coarse dust, powders or particles, gases and/or a combination thereof from the air flow received by the filtration system.

17. The process for creating the organic fuel product of claim 16, wherein the filtration bag is comprised of fabric having a capability to filter the air flow at an about ninety-nine percent (99%) efficiency including filtering particles having a size in a range of about one micron and more.

\* \* \* \* \*